US008246879B2

(12) United States Patent
Marangoni et al.

(10) Patent No.: US 8,246,879 B2
(45) Date of Patent: Aug. 21, 2012

(54) METHOD AND SYSTEM FOR FEEDING A CONTINUOUS ROD OF ELASTOMERIC MATERIAL AUTOMATICALLY TO A USER UNIT

(75) Inventors: Giorgio Marangoni, Rovereto (IT); Paolo Martinelli, Rovereto (IT); Luca Zerpelloni, Marco di Rovereto (IT)

(73) Assignee: Marangoni Meccanica S.p.A., Rovereto (IT)

( * ) Notice: Subject to any disclaimer, the term of this patent is extended or adjusted under 35 U.S.C. 154(b) by 0 days.

(21) Appl. No.: 12/090,886

(22) PCT Filed: Oct. 20, 2006

(86) PCT No.: PCT/EP2006/067607
§ 371 (c)(1),
(2), (4) Date: Sep. 9, 2008

(87) PCT Pub. No.: WO2007/045684
PCT Pub. Date: Apr. 26, 2007

(65) Prior Publication Data
US 2009/0026243 A1 Jan. 29, 2009

(30) Foreign Application Priority Data
Oct. 21, 2005 (IT) .............................. TO2005A0749

(51) Int. Cl.
*B29C 47/88* (2006.01)
(52) U.S. Cl. .................. 264/211.12; 425/113; 226/114; 198/813
(58) Field of Classification Search ............ 264/211.12; 425/113; 226/114; 198/813
See application file for complete search history.

(56) References Cited

U.S. PATENT DOCUMENTS

| 2,726,922 | A | * | 12/1955 | Merrill et al. ................ 425/140 |
| RE28,043 | E | | 6/1974 | Hinellne |
| 4,114,791 | A | * | 9/1978 | Schneider ....................... 226/91 |
| 4,279,683 | A | * | 7/1981 | Landsness ..................... 156/397 |
| 4,761,256 | A | * | 8/1988 | Hardenbrook et al. ...... 264/45.5 |
| 2004/0170716 | A1 | * | 9/2004 | Kondo et al. ................. 425/113 |

FOREIGN PATENT DOCUMENTS

| DE | 19850250 A | 5/2000 |
| DE | 20 2004 009247 U | 9/2004 |
| EP | 1 033 236 A | 9/2000 |
| FR | 2 443 412 A | 7/1980 |
| JP | 58139907 A * | 8/1983 |
| JP | 08-197131 A | 8/1996 |
| WO | WO 99/04960 | 2/1999 |

OTHER PUBLICATIONS

Webster definition for Rod as seen on www.dict.org (1913).*

* cited by examiner

*Primary Examiner* — Yogendra Gupta
*Assistant Examiner* — Amjad Abraham
(74) *Attorney, Agent, or Firm* — Frommer Lawrence & Haug LLP; Ronald R. Santucci

(57) ABSTRACT

A method and system for feeding a continuous rod of elastomeric material automatically to a user unit along a feed line having at least one powered portion and extending between an extruder, for forming the rod, and the user unit, and wherein, upstream from the powered portion, the rod is fed along a supporting device defining, for the rod and when at rest, a first path of given fixed length; and wherein, once the rod reaches and is engaged by the powered portion, a movable part of the supporting device is withdrawn from the first path to feed the rod along a second path, one portion of which is a bend of variable length.

6 Claims, 3 Drawing Sheets

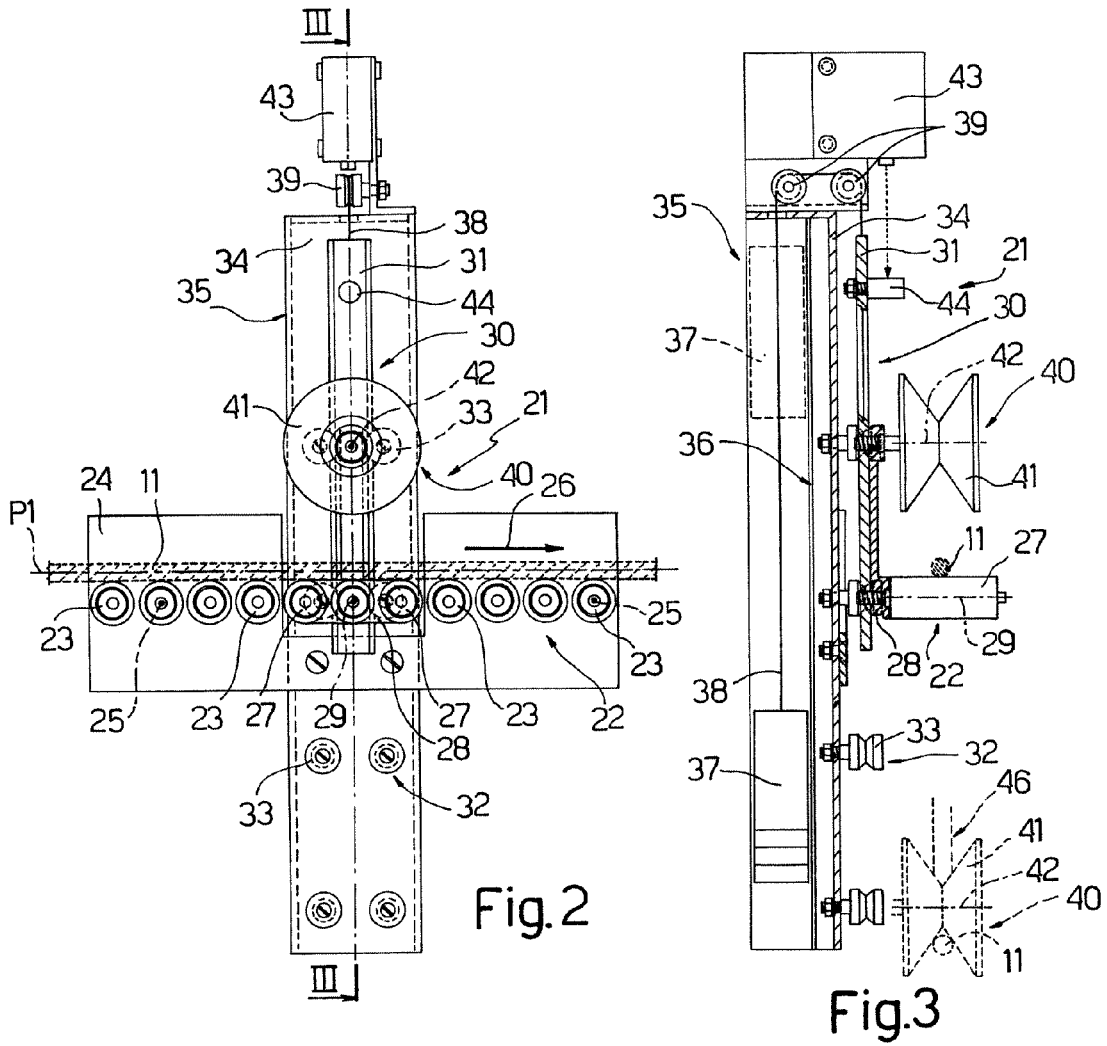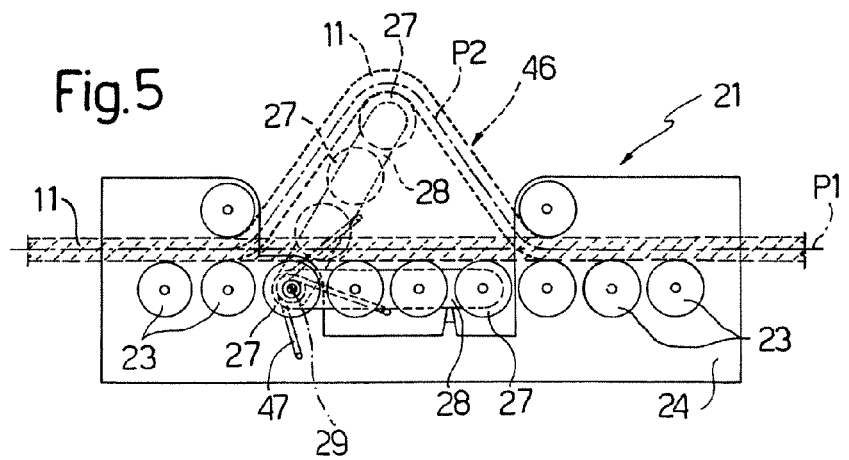

METHOD AND SYSTEM FOR FEEDING A CONTINUOUS ROD OF ELASTOMERIC MATERIAL AUTOMATICALLY TO A USER UNIT

This application is a 371 of PCT/EP2006/067607 filed on Oct. 20, 2006, published on Apr. 26, 2007 under publication number WO 2007/045684 A1 which claims priority benefits from Italian Patent Application Number TO2005A 000749 filed Oct. 21, 2005, the disclosure of which is incorporated herein by reference.

TECHNICAL FIELD

The present invention relates to a method and system for feeding a continuous rod of elastomeric material automatically to a user unit, preferably, though not necessarily, a unit for rubber-coating an annular surface of a toroidal body forming part of a tyre, to which the following description refers purely by way of example.

BACKGROUND ART

In the rubber industry, an annular surface of a toroidal body is known to be rubber-coated using a rubber-coating system, which coats the annular surface gradually with a strip of elastomeric material of given cross section. To do this, the toroidal body is mounted on a spindle, is rotated about its axis by a motor, and defines, with the spindle, a user unit of said strip.

In known systems of the above type, the strip is normally fed to the annular surface, and hence to the user unit, by a feed unit comprising an extruder for producing elastomeric material in the form of a normally circular-section rod; an applicator roller tangent to the annular surface; and a feed line for feeding the elastomeric material from the extruder to the applicator roller.

The feed line normally comprises a number of powered components arranged in series, and one of which is preferably, though not necessarily, a calender for transforming the rod produced by the extruder into said strip of given cross section. Each of the powered components is normally preceded, along the feed line, by a take-up unit designed to compensate for any difference in travelling speed between the powered component and either the part of the feed line or the extruder preceding the powered component, and to regulate the various travelling speeds to achieve a substantially constant mean travelling speed of the rod produced by the extruder.

For this purpose, known take-up units normally comprise a take-up device, which is supported, in use, by the rod at a bend of varying length, and is movable, alongside variations in the length of the bend, within a range defined by two control sensors located one over the other and a given distance apart.

The presence of a take-up unit of the above type along the feed line poses several drawbacks, in that, both when starting production and in the event of the rod breaking, the free end of the rod must be fed through the take-up unit by hand.

Other take-up units are known, for example from DE 20 2004 009247, which allow automatic feeding of a rod like element, but these take-up units are adapted for use with rod like elements having some axial rigidity only.

DISCLOSURE OF INVENTION

It is an object of the present invention to provide a method of feeding a continuous rod of elastomeric material to a user unit automatically, i.e. with no manual intervention required.

According to the present invention, there is provided a method of feeding a continuous rod of elastomeric material automatically to a user unit.

According to the present invention, there is also provided a system for feeding a continuous rod of elastomeric material automatically to a user unit.

BRIEF DESCRIPTION OF THE DRAWINGS

A number of non-limiting embodiments of the present invention will be described by way of example with reference to the accompanying drawings, in which:

FIG. 2 shows a larger-scale detail of FIG. 1;

FIG. 3 shows a section along line III-III in FIG. 2;

FIG. 5 shows a schematic side view of a variation of the FIG. 2 detail.

BEST MODE FOR CARRYING OUT THE INVENTION

Figure 1:
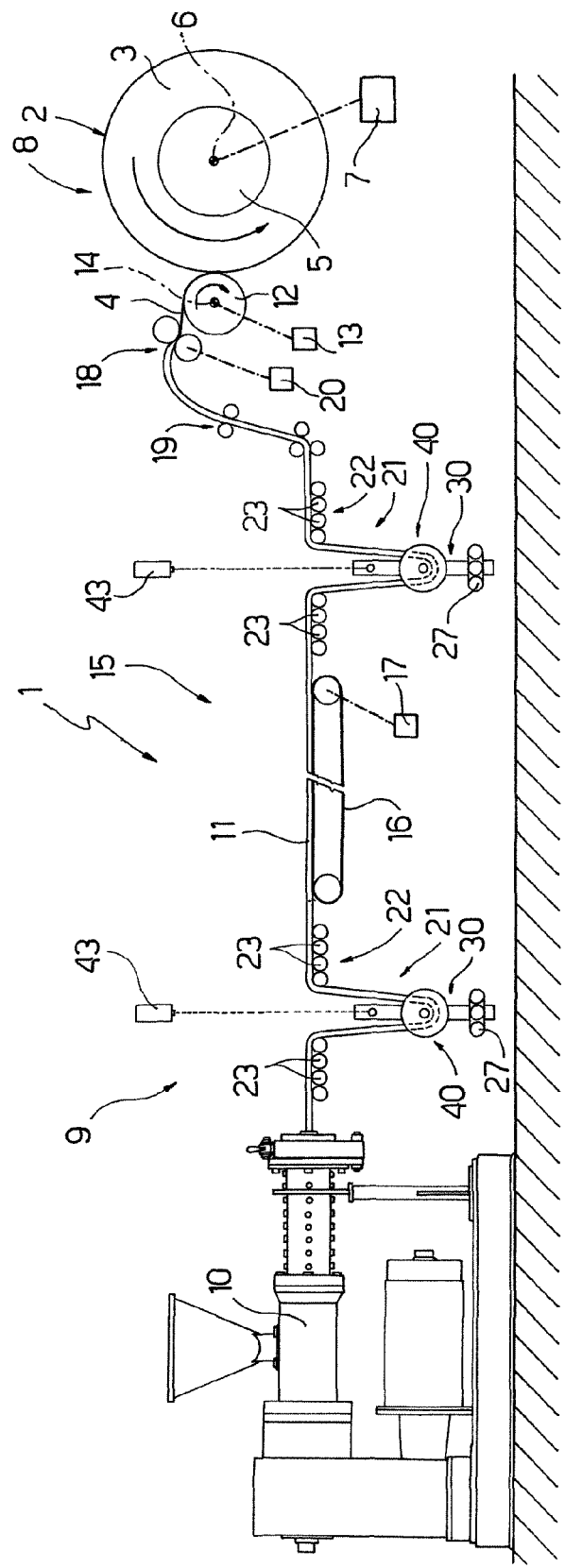
FIG. 1 shows a schematic side view of a preferred embodiment of the system according to the present invention.

Number 1 in FIG. 1 indicates as a whole a system for rubber-coating an annular surface 2 of a toroidal body 3 forming part of a tyre (not shown). Annular surface 2 is rubber-coated by coating it gradually with a strip 4 of elastomeric material of given cross section. To do this, toroidal body 3 is mounted on a spindle 5, is rotated about its axis 6, coaxial with annular surface 2, by a variable-speed motor 7, and defines, together with spindle 5, a user unit 8 of strip 4.

Strip 4 is fed to annular surface 2 by a feed unit 9 forming part of system 1 and comprising a screw extruder 10 for producing elastomeric material in the form of a normally circular-section rod 11; and an applicator roller 12 tangent, in use, to annular surface 2 and rotated about an axis 14 by a drive unit 13.

In a variation not shown, applicator roller 12 is idle, and spindle 5 substitutes for drive unit 13, which is eliminated.

System 1 also comprises a feed line 15 for feeding the elastomeric material from extruder 10 to applicator roller 12.

In the example shown, feed line 15 comprises a powered belt conveyor 16 for receiving rod 11 and powered by a drive unit 17; and a calender 18, which receives and transforms rod 11 into strip 4, is interposed between an output of belt conveyor 16 and applicator roller 12, has an input guide 19, and is powered by a drive unit 20.

The powered portions of feed line 15—in the example shown, conveyor 16 and calender 18—are each preceded by a respective take-up unit 21 for compensating any difference in the travelling speed of rod 11 up—and downstream from take-up unit 21.

In the feed line 15 shown by way of example, one of the two take-up units 21 controls the speed of the screw (not shown) of extruder 10, and the other controls drive unit 17 of conveyor 16.

Figure 4:
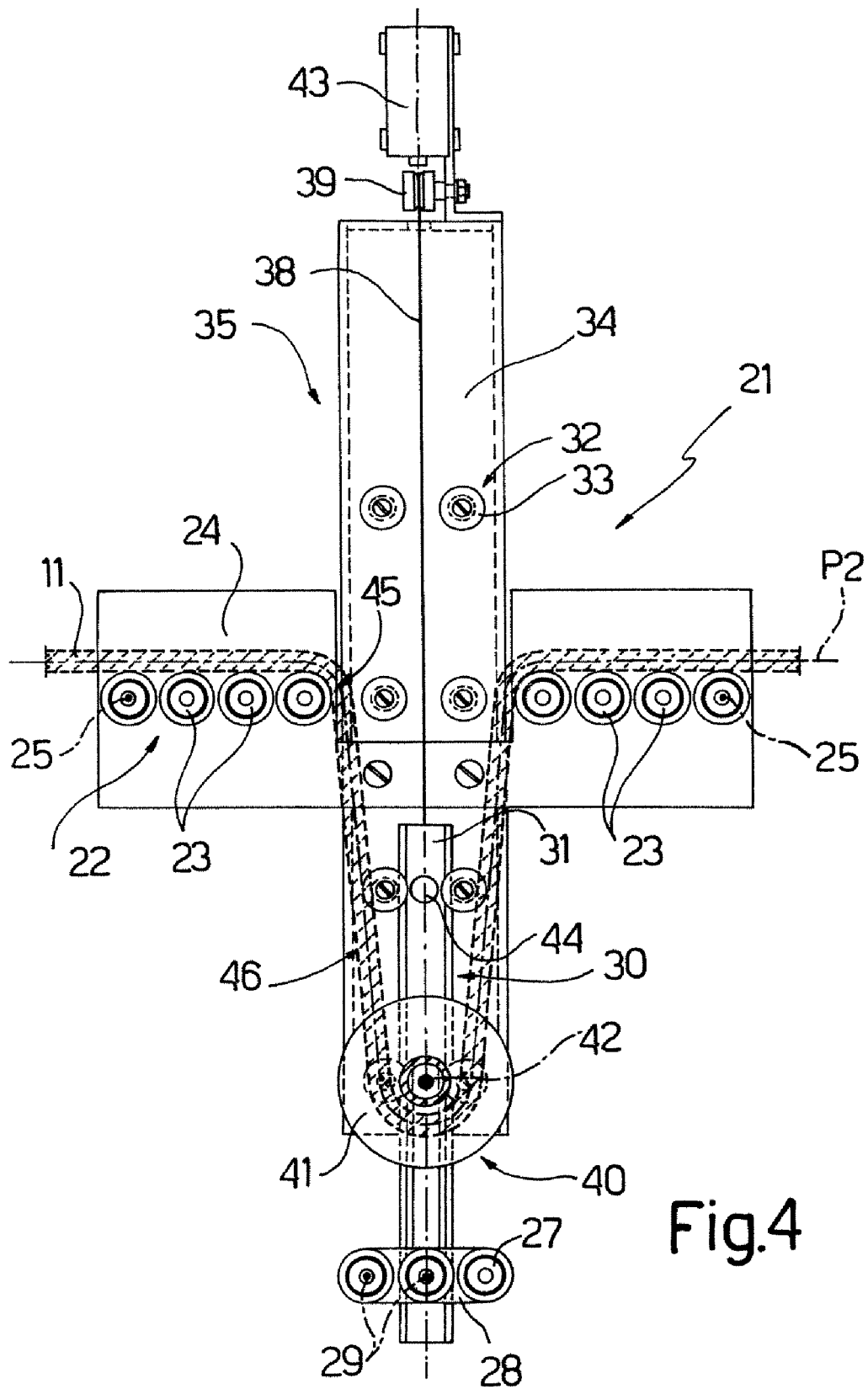
FIG. 4 shows the FIG. 2 detail in a different operating configuration.

As shown more clearly in FIGS. 2 to 4, each take-up unit 21 comprises a conveyor 22 having two end portions, each defined by a number of rollers 23 which may be idle or powered in known manner, and are fitted to a frame 24 to rotate about respective fixed, substantially horizontal axes 25, parallel to and coplanar with one another, to feed strip 11 in a direction 26 crosswise to axes 25. Conveyor 22 also has a central portion defined by a number of rollers 27, which may be idle or powered in known manner, and are fitted to a substantially horizontal cross member 28 parallel to direction 26. Rollers 27 rotate about respective axes 29, which are fixed with respect to cross member 28, are equally spaced along cross member 28, and are coplanar with one another and parallel to axes 25.

As shown more clearly in FIG. 3, cross member 28 forms part of a slide 30, which also comprises a substantially vertical shaft 31 fitted with cross member 28 close to its bottom end, and mounted to slide along a guide 32 defined by two numbers of idle guide rollers 33 parallel to rollers 23 and 27 and projecting from a front wall 34 of an upright 35.

Upright 35 is integral with frame 24, and has, behind front wall 34, a slide channel 36 for a counterweight 37, which is connected to the top end of shaft 31 by a cable 38 wound about two guide pulleys 39 fitted to the top of upright 35, and one of which may be powered.

Above cross member 28, shaft 31 is fitted with a take-up device 40 forming part of slide 30 and comprising a pulley 41 facing rollers 27 and fitted to shaft 31 to rotate about an axis 42 parallel to axes 25 and 29.

A sensor 43 is fitted to the top of upright 35 and aimed at a target 44, fitted to shaft 31, to determine the position of slide 30 along guide 32.

Counterweight 37 is adjustable so that it weighs a given amount less than slide 30, and can be locked, by a known automatic brake (not shown), into a lowered rest position (shown by the continuous line in FIG. 3), in which rollers 27 are maintained by cable 38 in a rest position coplanar with rollers 23. When released, counterweight 37 rises, by virtue of the difference in weight between counterweight 37 and slide 30, and the slide, in particular cross member 28, falls so that rollers 27 are no longer coplanar with rollers 23, thus forming, along conveyor 22 (FIG. 4), a window 45 centred with respect to guide 32 and wide enough to permit passage of take-up device 40.

Operation of system 1 will now be described commencing from the instant in which extruder 10 is idle, there is no rod 11, and take-up units 21 are in the FIG. 2 rest position, i.e. with relative rollers 27 coplanar with relative rollers 23, to define respective paths P1 for rod 11 in direction 26. At the same time, belt conveyor 16, calender 18 with applicator roller 12, spindle 5, and conveyors 22, if powered, are moving.

In connection with the above, it should be pointed out that each path P1 is substantially horizontal (but may slope in any direction, e.g. downwards), is substantially straight (but may be curved), extends in direction 26, and in any case is of a respective given fixed length.

At this point, operation of extruder 10 produces a rod 11, which is pushed onto conveyor 22 of the first take-up unit 21, and proceeds in direction 26, along relative path P1 tangent to relative coplanar rollers 23 and 27, up to belt conveyor 16. As it does so, rod 11 passes beneath take-up device 40 of the first take-up unit 21, seeing as relative pulley 41, when relative slide 30 is in the rest position, is located over relative path P1 and on the opposite side of relative path P1 to relative rollers 23 and 27. Rod 11 is fed by belt conveyor 16 to the second take-up unit 21, travels through it in the same way as described for the first take-up unit 21, and is fed to applicator roller 12 and then to surface 2 of toroidal body 3 via calender 18 and relative input guide 19.

Next, counterweight 37 of each take-up unit 21 is released, so that relative rollers 27 move down to form relative window 45, and relative take-lap device 40 comes to rest on rod 11, which travels through take-up unit 21 along a path P2 comprising a bend 46 of variable length and projecting downwards through relative window 45. In other words, take-up device 40 of each take-up unit 21 rests on rod 11 to tension rod 11 in proportion to the difference in weight between relative counterweight 37 and relative slide 30, and moves down into a variable work position in which take-up device 40 defines a bend 46 to compensate for any difference in the speeds imparted to rod 11 by the powered component upstream and the powered component downstream from relative take-up unit 21. Working in known manner on said speeds, relative sensor 43 provides for maintaining the length of relative bend 46 within a given range.

Conversely, each take-up device 40 may be released once rod 11 firmly engages the next powered component.

In the FIG. 5 variation, the same result is achieved by fitting cross member 28 directly to frame 24, so that cross member 28 is rotated about axis 29 of the first of its rollers 27 by a calibrated spring 47, which is coaxial with said axis 29, is interposed between cross member 28 and frame 24, and provides for tensioning rod 11. In this case, take-up unit 21 is defined by cross member 28 itself, and take-up device 40 by the last of rollers 27 in direction 26.

In a variation not shown, cross member 28 is rotated downwards in opposition to a brake member, e.g. a counterweight.

The invention claimed is:
1. A method of rubber-coating an annular surface (2) of a tire toroidal body (3); the method comprising the steps of:
  issuing a continuous rod (11) of elastomeric material from an emitting device (10);
  feeding the rod (11) automatically to a user unit (8) by a feed line (15) comprising at least one powered portion (16; 18) and a take-up unit (21) arranged upstream from the powered portion (16; 18) to apply a tension to the rod (11) and to compensate for any difference in the travelling speed of rod (11) upstream and downstream from take-up unit (21); and
  applying, at the user unit (8), the rod (11) to the annular surface (2) of the tire toroidal body (3);
  wherein the step of feeding the rod (11) to the user unit (8) comprises the further steps of:
  pushing, when the process is started for the first time, the rod by means of the emitting device (10) to move a front end portion of the rod (11) toward the powered portion (16; 18) of the feed line (15) along and above a supporting device (22) of the take unit (21) arranged upstream from the powered portion (16; 18), the supporting device (22) comprising a plurality of middle rollers (27) between a plurality of outside rollers (23) defining, for the rod (11), a coplanar first path (P1) of given fixed length;
  keeping the supporting device (22) of the take-up unit (21) in a rest position that does not apply any tension to the rod (11) until the rod (11) is not firmly engaged by the powered portion (16; 18) arranged downstream from the take-up unit (21);
  moving, once the front end portion of the rod (11) reaches and is engaged by the powered portion (16; 18) of the feed line (15), only the middle rollers (27) of the supporting device (22) to form a window (45) between the outside rollers (23) at an intermediate portion of the supporting device (22); and
  deviating the rod (11) through the window (45) by means of a take-up device (40) that rests on the rod (11) to feed the rod (11) along a U-shaped second path (P2) extending inside the window (45) and comprising a bend (46) of variable length for tensioning the rod (11) once the front end portion of the rod (11) reaches and is engaged by the powered portion (16; 18) of the feed line (15).

2. A method as claimed in claim 1, wherein, when withdrawn from the first path (P1), said middle rollers (27) are retained by the rod (11) in a variable work position at said bend (46) to impart a given, substantially constant tension to the rod (11).

3. A method as claimed in claim 2, wherein, in said variable work position, said middle rollers (27) are supported by the rod (11) at the bend (46), and applies said tension by force of gravity.

4. A method as claimed in claim 2, wherein, in said variable work position, said middle rollers (27) apply said tension to the rod (11) at the bend (46) by virtue of thrust imparted to the middle rollers (27) by calibrated thrust means (30, 37; 47).

5. A method as claimed in claim 1, wherein the rod (11) is emitted by an extruder (10).

6. A method as claimed in claim 1, wherein the first path (P1) is substantially horizontal.

* * * * *